US012689265B2

(12) United States Patent
Reed et al.

(10) Patent No.: US 12,689,265 B2
(45) Date of Patent: Jul. 21, 2026

(54) MOTOR AIR GAP OIL FLOW MANAGEMENT

(71) Applicant: Allison Transmission, Inc., Indianapolis, IN (US)

(72) Inventors: William Scott Reed, Greenfield, IN (US); Austin Morris, Avon, IN (US); Upkar Singh Ubhi, Greenwood, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 436 days.

(21) Appl. No.: 18/457,099

(22) Filed: Aug. 28, 2023

(65) Prior Publication Data

US 2025/0079938 A1 Mar. 6, 2025

(51) Int. Cl.
*H02K 9/19* (2006.01)
*H02K 5/173* (2006.01)
*H02K 7/08* (2006.01)

(52) U.S. Cl.
CPC ............. *H02K 9/19* (2013.01); *H02K 5/1732* (2013.01); *H02K 7/083* (2013.01)

(58) Field of Classification Search
CPC ......... H02K 9/19; H02K 5/1732; H02K 7/083
See application file for complete search history.

(56) References Cited

U.S. PATENT DOCUMENTS

| | | | |
|---|---|---|---|
| 2008/0024020 A1* | 1/2008 | Iund | B60L 50/61 |
| | | | 310/90 |
| 2021/0351664 A1 | 11/2021 | Jackson et al. | |
| 2022/0112898 A1 | 4/2022 | Li et al. | |

FOREIGN PATENT DOCUMENTS

| | | | |
|---|---|---|---|
| CN | 111756141 B | 8/2021 | |
| EP | 2835544 A2 * | 2/2015 | F16C 33/38 |
| WO | 2022167747 A1 | 8/2022 | |

* cited by examiner

*Primary Examiner* — Terrance L Kenerly
(74) *Attorney, Agent, or Firm* — Woodard, Emhardt, Henry, Reeves & Wagner, LLP

(57) ABSTRACT

A system with a flow deflector that generally directs the flow of multiple fluids, such as lubricants and/or coolants, so as to reduce fluid flow collisions or other flow hinderances. With this system, motor temperatures are able to be more tightly controlled, with less power loss to heat. When used in an electric motor, the flow deflector baffles most of the oil from one side of the motor to enable the oil from a single side or end of the motor to flow unimpeded through a rotor-stator gap. The flow deflector is further shaped to guide fluid radially outwards towards the sump so as to further reduce interactions between the various oil flow paths.

20 Claims, 8 Drawing Sheets

102

145

150

155

115

130

165

110

160

105

148

125

152

120

MOTOR AIR GAP OIL FLOW MANAGEMENT

BACKGROUND

Lubricants are commonly used in motors, such as electric motors, to lubricate and cool various parts within the motor. The lubricants are typically recirculated within the motor from a sump or other reservoir. Without a proper flow of lubricant within the motor, parts of the motor can prematurely wear, overheat, and even seize.

Thus, there is a need for improvement in this field.

SUMMARY

Some motor designs may contain multiple flow paths for lubricants, such as oil, for lubricating and cooling various components within the motor. It was discovered that these multiple lubricant flow paths may hinder or interfere with one another such that the lubricant may not properly lubricate and/or cool various parts of the motor. For instance, two lubricant flow paths can flow in opposite directions along the same part so as to counteract one another such that one or more dead or stagnate zones are created where very little lubricant flow occurs. In these dead zones, the motor may experience excessive wear and/or overheating due to insufficient cooling and lubrication.

For any moving parts within the motor, these multiple flow path directions can further increase drag or spin loss which in turn reduces efficiency of the motor. For instance, these multiple flow path losses can occur in electric motors. In electric motors, the gap between a rotor and stator is commonly minimized because the electric motor can generate greater torque when the distance or gap between the rotor and stator is reduced. In other words, reducing the rotor-stator gap increases the efficiency of the electric motor. To maintain this small gap between the rotor and stator, the electric motor usually has bearings at both ends of the rotor. These types of bearings typically need to be lubricated. Heat is also generated in this narrow cylindrical gap between the rotor and the stator. To dissipate this heat and lubricate the bearings, a lubricant, such as oil, is directed to flow through the bearings and within the gap between the rotor and stator. Common electric motor designs often flood both ends of this gap between the rotor and stator with oil. However, it was discovered that flowing the oil from opposite ends of this rotor-stator gap creates dead or stagnate zones which in turn create hot spots and other issues. When flowing in from both directions, the oil is held and backed up in the rotor-stator gap. The rotor-stator gap becomes full of stagnate oil which in turn increases friction and spin loss in the rotor.

A unique lubrication system and method of lubricating a motor has been developed to address these as well as other issues. The system has a unique flow deflector that generally directs the flow of multiple fluids, such as lubricants and/or coolants, so as to reduce fluid flow collisions or other flow hindrances. In other words, the lubricants flow in the same overall direction. With this design, motor temperatures are able to be more tightly controlled, with less power loss to heat. When incorporated into an electric motor, motor efficiency is enhanced due to less power loss from friction and heat at the rotor-stator gap. The flow deflector baffles most (if not all) of the oil from one side of the motor to enable the oil from the opposite side to flow unimpeded through the rotor-stator gap. In one variation, baffling in the housing is used to direct the oil flow. Alternatively or additionally, shielding and a system of oil return passages on the oil restricted side of the motor are used to direct the oil flow.

In one version, the flow deflector is incorporated in an electric motor. The electric motor has a rotor that rotates relative to a stator. A relatively small gap is defined between the rotor and stator, and bearings (and optionally bushings) are disposed on opposite ends of a rotor shaft to maintain the rotor-stator gap. The bearings at each end have a dedicated oil flow path for lubrication and/or cooling purposes. The electric motor further has a flow deflector that is positioned and shaped to direct the lubricant flow paths to avoid interfering with one another. Together, the lubricant flow paths are generally directed towards one end where a sump is positioned to collect and recirculate the lubricant. In other words, the flow deflector is positioned so that the multiple flows generally do not collide or otherwise cross paths so as to interfere with one another.

From an end of the motor where the oil is supplied, the oil is split into at least two general flow paths for lubricating and/or cooling the two sets of bearings located at opposite ends of the rotor. At the end where the oil is supplied, one oil flow path is used to lubricate the bearings at that end. After lubricating the bearings, the oil is then directed to flow through the gap between the rotor and stator so as to cool the rotor and stator. For the other oil flow path, the oil flows through a passage in a rotor shaft at the end that is opposite to the end where the oil is initially supplied. At least some of the oil from the rotor shaft flows through and lubricates the bearings located at that end. After lubricating the bearings, the flow deflector directs the oil from this flow path away from the rotor-stator gap.

As noted before, oil coming off of the bearings (and bushings) at both ends of the motor in traditional motor designs normally flow into the rotor-stator gap. Once more, the oil in these traditional motor designs are held or backed up in the rotor-stator gap since the oil is entering from both directions. In the present design, the flow deflector reduces or even eliminates the flow of oil from one end such that the oil flows from only one of the directions through the rotor-stator gap. In one form, the flow deflector, a track of the motor housing, and a directed oil drain allows the oil entering the rotor-stator gap from the oil supply end of the motor to pass through the rotor-stator gap in an unobstructed manner. In other words, the flow deflector returns most or even all of the oil on one side of the motor to the sump. Any oil that enters the rotor-stator gap from the oil supply end of the motor flows through the rotor-stator gap unimpeded by any oil flowing in the opposite direction. The flow deflector is further shaped to guide fluid radially outwards towards the sump so as to further reduce interactions between the various oil flow paths. The sump is configured to collect the oil from the two general flow paths and recirculate the collected oil back to the oil supply end of the motor.

With this unique design, the rotor-stator gap is not flooded full of oil such that the friction in the rotor-stator gap is reduced. This reduced friction in turn results in lower spin loss of the rotor. Moreover, the oil moving through the rotor-stator gap in one direction does not generally stagnate oil so as to enhance cooling of the rotor and stator in the electric motor.

Depending on desired operational characteristics, the flow deflector, baffles, and/or other structures to direct flow can be disposed proximal to either end of the motor, or even somewhere between the ends. In one variation, the flow of oil from a more turbulent side or end of the motor is directed through the stator-rotor gap. This turbulence can be created from gearing and/or other parts within the motor. By flowing the oil from the more turbulent end of the motor through the rotor-stator gap reduces flow turbulence. In one version, the flow deflector is positioned on the side of the motor opposite the gearing in order to direct the fluid with less turbulent flow. In another variation, the flow deflector is positioned at the oil or lubricant supply end such that the oil discharged from the rotor shaft at the opposite end flows through the rotor-stator gap.

A unique method of manufacturing and assembling the system has been developed. In one form, the flow deflector is directly attached to a housing of the motor. For instance, the flow deflector is a discrete part that is bolted and/or otherwise fastened to the housing. In another variation, the flow deflector is integrally formed with the housing or other component of the motor. To further facilitate assembly, the flow deflector is shaped to fit within the tight confines of the motor. In one version, the flow deflector is a stamped metal part, and in other versions, the flow deflector is 3D (three-dimensionally) printed from plastic and/or metal.

The system and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a motor.

Aspect 3 generally concerns the system of any previous aspect including an electric motor.

Aspect 4 generally concerns the system of any previous aspect in which the motor is an electric motor.

Aspect 5 generally concerns the system of any previous aspect including a stator.

Aspect 6 generally concerns the system of any previous aspect including a rotor.

Aspect 7 generally concerns the system of any previous aspect in which the electric motor including a stator and a rotor configured to rotate relative to the stator.

Aspect 8 generally concerns the system of any previous aspect in which the rotor and the stator define a gap.

Aspect 9 generally concerns the system of any previous aspect including one or more bearings disposed at opposite ends of the rotor.

Aspect 10 generally concerns the system of any previous aspect in which the motor has a first end and a second end located opposite the first end along a rotational axis of the motor.

Aspect 11 generally concerns the system of any previous aspect including a first bearing set disposed at the first end.

Aspect 12 generally concerns the system of any previous aspect including a second bearing set disposed at the second end.

Aspect 13 generally concerns the system of any previous aspect in which the motor has a first flow path of a fluid configured to lubricate the first bearing set.

Aspect 14 generally concerns the system of any previous aspect in which the motor has a second flow path of the fluid configured to lubricate the second bearing set.

Aspect 15 generally concerns the system of any previous aspect in which the second flow path flows through the gap between the rotor and the stator.

Aspect 16 generally concerns the system of any previous aspect in which the fluid is a lubricant.

Aspect 17 generally concerns the system of any previous aspect in which the lubricant includes oil.

Aspect 18 generally concerns the system of any previous aspect in which the fluid is oil.

Aspect 19 generally concerns the system of any previous aspect including a shaft.

Aspect 20 generally concerns the system of any previous aspect in which the shaft defines a passage from the first end to the second end of the motor for the first flow path.

Aspect 21 generally concerns the system of any previous aspect in which the electric motor has a first end and a second end located opposite the first end.

Aspect 22 generally concerns the system of any previous aspect in which the electric motor has a first flow path and a second flow path for a fluid.

Aspect 23 generally concerns the system of any previous aspect including a housing.

Aspect 24 generally concerns the system of any previous aspect including a deflector.

Aspect 25 generally concerns the system of any previous aspect in which the deflector is attached to the housing of the motor.

Aspect 26 generally concerns the system of any previous aspect in which the deflector is configured to inhibit the fluid from the first flow path from flowing into the gap between the rotor and the stator.

Aspect 27 generally concerns the system of any previous aspect in which the deflector configured to promote fluid flow in a single direction within the gap between the rotor and the stator.

Aspect 28 generally concerns the system of any previous aspect in which the deflector is configured to promote the fluid from the second flow path to flow in a single direction within the gap between the rotor and the stator.

Aspect 29 generally concerns the system of any previous aspect in which the deflector forms a gutter to redirect flow.

Aspect 30 generally concerns the system of any previous aspect in which the deflector has a mounting flange, a rotor flange, and a drainage wall connecting the mounting flange to the rotor flange.

Aspect 31 generally concerns the system of any previous aspect in which the mounting flange has one or more fastener openings where the deflector is fastened to the motor.

Aspect 32 generally concerns the system of any previous aspect in which the fastener openings are spaced evenly apart from one another around a circumference of the mounting flange.

Aspect 33 generally concerns the system of any previous aspect in which the rotor flange defines a rotor opening in which the rotor is received.

Aspect 34 generally concerns the system of any previous aspect in which the drainage wall extends at a transverse angle from the mounting flange.

Aspect 35 generally concerns the system of any previous aspect in which the drainage wall extends to give the deflector an overall frustoconical shape.

Aspect 36 generally concerns the system of any previous aspect in which the deflector is configured to inhibit flow stagnation in the motor.

Aspect 37 generally concerns the system of any previous aspect in which the deflector configured to form a barrier between the first flow path and the second flow path.

Aspect 38 generally concerns the system of any previous aspect in which the deflector prevents the first flow path from intersecting the second flow path.

Aspect 39 generally concerns the system of any previous aspect in which the deflector is configured to redirect fluid towards a sump.

Aspect 40 generally concerns the system of any previous aspect in which the deflector is positioned at an end of the motor.

Aspect 41 generally concerns the system of any previous aspect in which the deflector is positioned at the end that is opposite to an end of the motor with more turbulent flow.

Aspect 42 generally concerns the system of any previous aspect in which the second end has more turbulent flow of the fluid than the first end.

Aspect 43 generally concerns the system of any previous aspect in which the deflector is a three-dimensionally printed component.

Aspect 44 generally concerns the system of any previous aspect in which the motor includes a housing.

Aspect 45 generally concerns the system of any previous aspect in which the deflector is an integrally formed with the housing of the motor.

Aspect 46 generally concerns the system of any previous aspect in which the deflector is configured to deflect a flow of a fluid.

Aspect 47 generally concerns the system of any previous aspect in which the deflector is configured to impede fluid in each fluid flow path from flowing against the fluid in the other fluid flow path.

Aspect 48 generally concerns the system of any previous aspect in which the deflector is positioned at the first end of the motor.

Aspect 49 generally concerns the system of any previous aspect including a drain.

Aspect 50 generally concerns the system of any previous aspect in which the housing defines a drain.

Aspect 51 generally concerns the system of any previous aspect including a track.

Aspect 52 generally concerns the system of any previous aspect in which the housing defines a track.

Aspect 53 generally concerns the system of any previous aspect including sump.

Aspect 54 generally concerns the system of any previous aspect in which the housing defines a sump.

Aspect 55 generally concerns the system of any previous aspect in which the deflector is configured to direct fluid flow to the sump.

Aspect 56 generally concerns a method.

Aspect 57 generally concerns the method of any previous aspect including lubricating a first bearing set at a first end of a motor with a fluid flowing along a first flow path.

Aspect 58 generally concerns the method of any previous aspect including lubricating a second bearing set at a second end of the motor with the fluid flowing along a second flow path.

Aspect 59 generally concerns the method of any previous aspect including deflecting with a deflector the fluid of the first flow path away from the second flow path.

Aspect 60 generally concerns the method of any previous aspect in which the deflecting occurs after the lubricating the first bearing set.

Aspect 61 generally concerns the method of any previous aspect including collecting the fluid from the first flow path and the second flow path in a sump.

Aspect 62 generally concerns the method of any previous aspect including directing the fluid of the second flow path into a gap between a rotor and a stator.

Aspect 63 generally concerns the method of any previous aspect in which the deflecting includes inhibiting with the deflector flow of the fluid of the first flow path into the gap between the rotor and the stator.

Aspect 64 generally concerns the system or method of any previous aspect in which the rotor includes a rotor shaft.

Aspect 65 generally concerns the system or method of any previous aspect in which the rotor shaft is disposed at the first end.

Aspect 66 generally concerns the system or method of any previous aspect in which the rotor includes a rotor gear.

Aspect 67 generally concerns the system or method of any previous aspect in which the rotor gear is disposed at the second end.

Aspect 68 generally concerns the system or method of any previous aspect including one or more bushings disposed at opposite ends of the rotor.

Aspect 69 generally concerns the system or method of any previous aspect in which the motor is configured to lubricate bushings.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
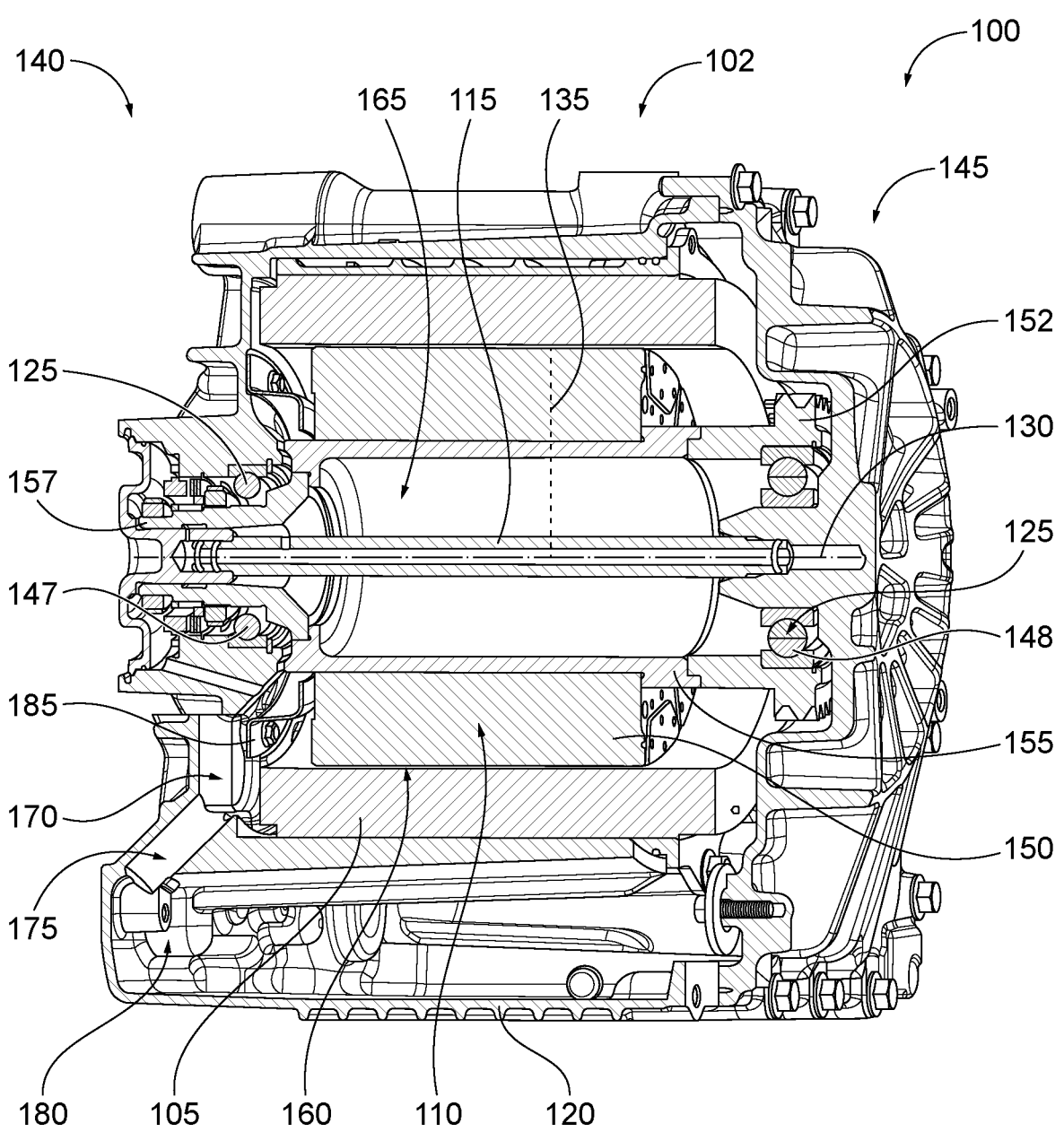
FIG. 1 is a cross-sectional view of a system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 depicts a cross-sectional view of a system 100 according to one example. The system 100 includes a motor 102. Typically, the motor 102 is used in the drivetrain of a vehicle. For example, the motor 102 may be utilized in medium- or heavy-duty trucks and/or buses. In one embodiment, the motor 102 is configured to provide propulsion to the vehicle. It can be appreciated that the system 100 could include a different rotational device instead of the motor 102. For example, the system 100 may include an engine, a transmission, a gearset, and/or another device that supports rotational motion. In yet another embodiment, the system 100 includes the motor 102 and another rotational device within a common housing. For example, the motor 102 may be part of an integrated axle that includes one or more other motors, engines, transmissions, gearsets, and/or other types of rotational devices.

In the illustrated example, the motor 102 is an electric motor, but the motor 102 can include other types of motors. The motor 102 in the depicted example includes a stator 105, a rotor 110, a lubricant shaft 115, a housing 120, and one or more bearings 125. The stator 105 is rotatably coupled to the rotor 110 and the lubricant shaft 115. The stator 105 is configured to remain stationary relative to the housing 120 while the rotor 110 rotates. In some cases, the lubricant shaft 115 is fixedly coupled to the rotor 110 and is configured to rotate with the rotor 110. The motor 102 is configured to couple to another rotational device through the rotor 110 and/or the lubricant shaft 115 in order to transfer mechanical energy. The center of the lubricant shaft 115 defines an axis 130. The rotor 110 is configured to rotate about the axis 130. Further, the motor 102 defines a radius 135 in a direction perpendicular to the axis 130. In the illustrated embodiment, the stator 105 is positioned radially outwards from the rotor 110 along the radius 135. The rotor 110 is positioned radially outwards from the lubricant shaft 115 along the radius 135.

The stator 105, rotor 110, and lubricant shaft 115 are each generally cylindrical in shape. In one embodiment, the stator 105 defines a central opening to contain a portion of the rotor 110, and the rotor 110 defines a central opening to contain a portion of the lubricant shaft 115. The stator 105, rotor 110, and lubricant shaft 115 are made of rigid materials in order to structurally support the rotation of components in the motor 102. For example, the stator 105, rotor 110, and/or lubricant shaft 115 are made from aluminum, iron, steel, and/or other materials. In the illustrated embodiment, the motor 102 is an electric motor. In one example, the motor 102 is an induction machine and the stator 105 and rotor 110 further include electrically conductive windings. In another example, at least a portion of the stator 105 and/or the rotor 110 includes permanent magnets and/or magnetically permeable material.

The housing 120 is positioned radially outside of the stator 105, rotor 110, and lubricant shaft 115. The housing 120 is formed from a rigid material and protects the internal components of the motor 102. The housing 120 further defines spaces to position parts of the motor 102 and spaces around parts for lubricating and/or cooling fluid to flow. In one embodiment, the housing 120 is monolithic. For example, the housing 120 may be cast and/or 3D printed as one piece. In another embodiment, the housing 120 is composed of multiple portions that are fastened together. The stationary parts of the motor 102 are configured to couple to the housing 120 using one or more fasteners. In one embodiment, the stator 105 forms a portion of the housing 120.

The bearings 125 are rotatably coupled to one or more ends of the rotor 110 and housing 120. In one embodiment, the bearings 125 are further rotatably coupled to one or more bushings. The bearings 125 fix the position of the rotor 110 relative to the axis 130 and support rotation of the rotor 110 about the axis 130. The motor 102 defines one or more spaces for lubricating and/or cooling fluid to flow through the bearings 125. Among other things, lubricating and cooling the bearings 125 enhances operational efficiency of the motor 102.

The motor 102 further includes a first end 140 (oil supply end) and a second end 145 (sump end) located on opposite sides. To support rotation about the axis 130, the motor 102 includes first bearings 147 on the first end 140 and second bearings 148 on the second end 145. In the illustrated example, the first bearings 147 and second bearings 148 are both positioned between portions of the rotor 110 and housing 120. In an alternate example, the first bearings 147 and/or second bearings 148 are positioned between bushing sets and the rotor 110 and/or housing 120. In one embodiment, the first bearings 147 and second bearings 148 extend fully circumferentially around the axis 130.

The rotor 110 includes a rotor body 150, a rotor gear 152, a first rotor shaft 155, and a second rotor shaft 157. The rotor body 150 is a portion of the rotor that is generally positioned near the stator along the radius 135. In the illustrated example, the rotor gear 152, first rotor shaft 155, and second rotor shaft 157 are positioned radially inward from the rotor body 150. The rotor body 150, rotor gear 152, first rotor shaft 155, and second rotor shaft 157 are each generally cylindrical in shape. In one embodiment, the rotor gear 152, first rotor shaft 155, and second rotor shaft 157 are coupled such as to rotate together. In another embodiment, the rotor gear 152, first rotor shaft 155, and/or second rotor shaft 157 are free to rotate relative to other portions of the rotor 110. The rotor body 150, rotor gear 152, first rotor shaft 155, and second rotor shaft 157 are made of rigid materials in order to structurally support the rotor 110 and/or other components in the motor 102. For example, the rotor body 150, rotor gear 152, first rotor shaft 155, and/or second rotor shaft 157 are made from aluminum, iron, steel, and/or other materials. In the illustrated embodiment, the second rotor shaft 157 contacts the first bearings 147 to maintain the position of the rotor 110 on the first end 140 during rotation. The first bearings 147 on the first end 140 are positioned between the second rotor shaft 157 and a portion of the housing 120. Similarly, the rotor gear 152 contacts the second bearings 148 to maintain the position of the rotor 110 on the second end 145 during rotation. The second bearings 148 on the second end 145 are positioned between the rotor gear 152 and a portion of the housing 120. As should be appreciated, the first bearings 147 and/or second bearings 148 could contact other portions of the motor 102, such as the stator 105, the first rotor shaft 155, and/or various bushings as examples.

The stator 105 and rotor 110 define a gap 160 between each other. The gap 160 extends fully circumferentially between and fully along the axial depth of the stator 105 and rotor 110. The gap 160 provides separation between the stator 105 and rotor 110 such that rotor 110 may rotate within the stator 105. The thickness of the gap 160 along the radius 135 is very small relative to thicknesses of the stator 105 and rotor 110. For example, the thickness of the gap 160 along the radius 135 is less than or equal to one millimeter.

The rotor 110 further defines a rotor cavity 165 in an interior portion of the first rotor shaft 155. In the illustrated example, the rotor cavity 165 further extends within portions of the rotor gear 152 and second rotor shaft 157. The rotor cavity 165 extends radially outward around the lubricant shaft 115. By reducing the total weight of the rotor 110, the rotor cavity 165 may reduce the cost of the rotor 110 and/or allow the rotor 110 to spin faster. Additionally, the rotor cavity 165 provides a space for heat to transfer from the rotor 110 to a fluid, such as an oil-based lubricant and/or coolant.

The motor 102 defines one or more pathways for a fluid, such as oil, to flow to different parts of the motor 102. The fluid lubricates and/or cools parts of the motor 102 that contact the fluid. Primarily, the pathways route fluid to at least the first bearings 147 and second bearings 148. The fluid flow through the first bearings 147 and second bearings 148 helps the motor 102 supply high torques by reducing friction and reducing heat build-up. In one embodiment, the gap 160 forms at least a portion of a pathway in order to supply fluid to the first bearings 147 and/or second bearings 148. Fluid that flows through the gap 160 absorbs and removes heat from the stator 105 and rotor 110. In another embodiment, an interior portion of the lubricant shaft 115 forms at least a portion of a pathway in order to supply fluid to the first bearings 147 and/or second bearings 148. In yet another embodiment, a pathway branches from the interior of the lubricant shaft 115 in order to supply fluid to the rotor cavity 165. Fluid flow through the lubricant shaft 115 and in the rotor cavity 165 helps to cool the stator 105 and/or lubricate other parts of the motor 102. In one embodiment, the fluid is oil. In an alternate embodiment, the fluid is a gas, another liquid, or a mixture of different fluids that are used for lubrication and/or cooling.

To collect fluid after flowing through the motor 102, the motor 102 defines a track 170, a drain 175, and a sump 180. In the illustrated embodiment, the housing 120 defines one portion of the track 170 and the stator 105 and rotor 110 define another portion of the track 170. Additionally, the housing 120 defines the drain 175 and sump 180 in the illustrated embodiment. The track 170 provides a space for fluid to flow out from other fluid pathways of the motor 102 and guides fluid into the drain 175 towards the sump 180. The track 170 and drain 175 are positioned on the first end 140 such that fluid collects on one end of the motor 102. The sump 180 provides a space for fluid to collect. The sump 180 is positioned on a lower side of the motor 102 such that fluid naturally flows into the sump 180 due to gravity. In one embodiment, the fluid is recirculated from the sump 180 to another part of the motor 102 or another device on the vehicle. For example, the vehicle may pump oil from the sump 180 to a transmission and/or motor within an integrated axle.

In order to manage fluid flow, the motor 102 includes a deflector 185. The deflector 185 is positioned between different pathways for fluid and forms a barrier between the pathways. The deflector 185 redirects fluid from different pathways in the motor 102 in order to enhance fluid flow. Specifically, the deflector 185 prevents fluid that is flowing in one direction from flowing into fluid that is flowing in an opposite direction. For example, the deflector 185 may prevent fluid on the first end 140 from flowing into the gap 160 in order to allow fluid on the second end 145 to flow through the gap 160 in an unobstructed manner. In an additional example, the deflector 185 may prevent fluid in the gap 160 from flowing into the first bearings 147 in order to allow fluid on the first end 140 to pass through the first bearings 147 in an unobstructed manner.

In one form, the deflector 185 is made from a rigid material such that fluid flow does not deform the shape of the deflector 185. For example, the deflector 185 may be made of aluminum or hard plastic. Generally, the thickness of the deflector 185 is relatively thin such that the deflector 185 can be positioned between parts of the motor 102. In one embodiment, the deflector 185 is 3D printed. For example, the deflector 185 may be 3D printed from metal or plastic in order to fit within a space of a specific motor. In one embodiment, the deflector 185 is fastened to the housing 120 using one or more bolts and/or other fasteners. In another embodiment, the deflector 185 is a portion of the housing 120. For example, the housing 120 and the deflector 185 can be 3D printed and/or cast as a monolithic part.

Figure 2:
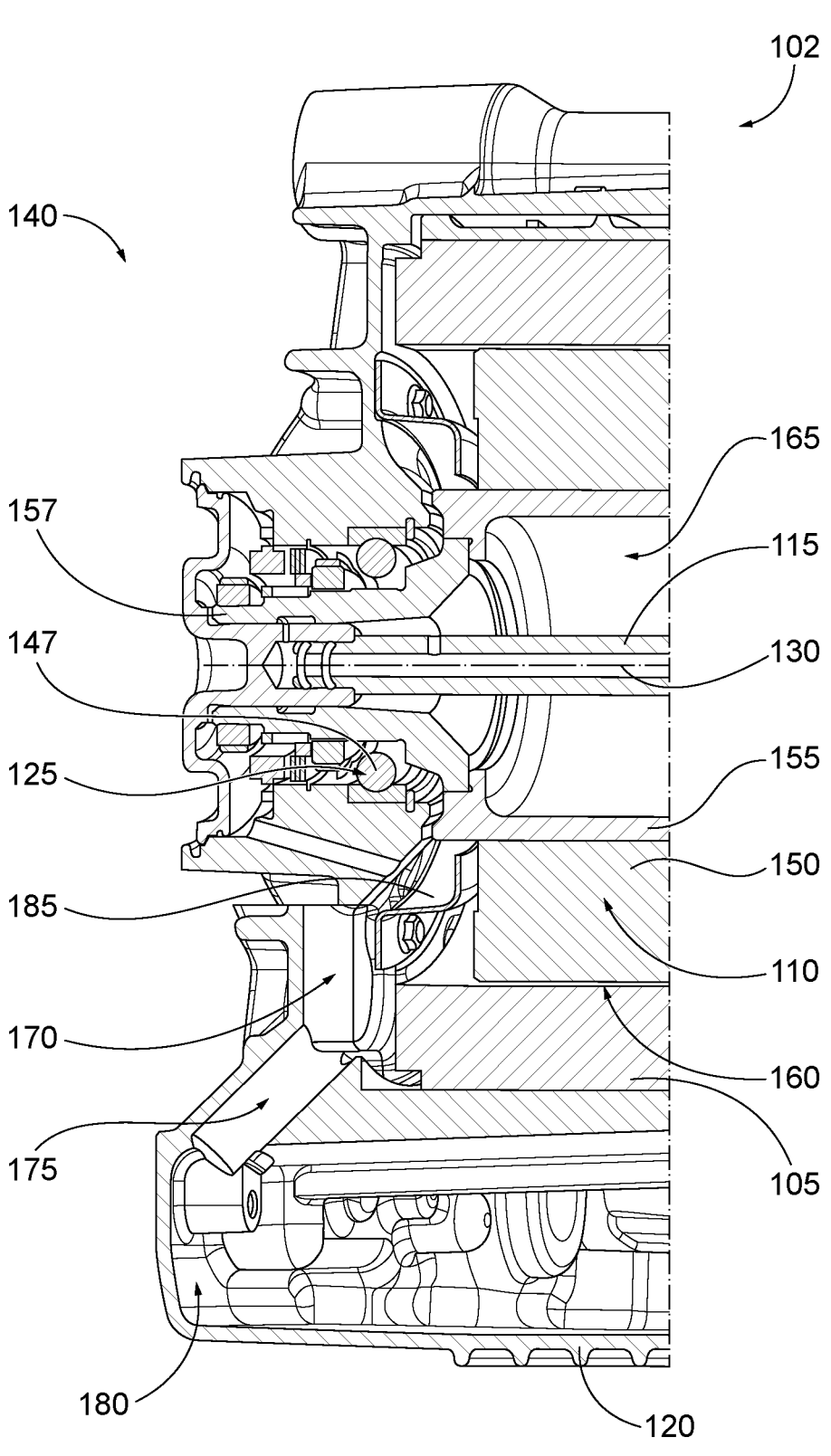
FIG. 2 is a cross-sectional view of a first end of the FIG. 1 system.

FIG. 2 depicts a cross-sectional view of the first end 140 of the motor 102 shown in FIG. 1. As illustrated, the deflector 185 is positioned on the first end 140. The shape of the deflector 185 is sloped in a radial direction such that the deflector 185 guides fluid towards the track 170 and drain 175 and subsequently to the sump 180. For example, the deflector 185 may be sloped such that fluid that travels towards the first end 140 in a direction along the axis 130 is redirected radially outward. In the same example, fluid that travels towards the second end 145 from the first end 140 is redirected back towards the first end 140 and radially outward. In this way, the deflector 185 is configured to redirect fluid from multiple pathways towards the sump 180.

In one embodiment, the deflector 185 is positioned on the first end 140 because the fluid flow is less turbulent on the first end 140 compared to the second end 145. For example, the motor 102 may include a larger quantity of gears on the second end 145 than on the first end 140 such that the gears on the second end 145 increase the turbulence of the fluid flow on the second end 145. In another example, the shape of gears, the housing 120, and/or other parts of the motor 102 positioned on the second end 145 may cause the flow to be more turbulent on the second end 145 than on the first end 140. The deflector 185 is typically more effective at redirecting the fluid when the flow is less turbulent.

On the first end 140, the motor 102 defines multiple spaces to contain fluid. The spaces form at least a portion of the pathways where fluid flows throughout the motor 102. In one embodiment, the housing 120 fully defines at least one space for fluid on the first end 140. In another embodiment, the housing 120 and the rotor 110 define a space for fluid between each other on the first end 140. In one version, the housing 120 and the second rotor shaft 157 of the rotor 110 define a space for fluid between each other on the first end 140. For example, fluid may flow around the first bearings 147 that are positioned in a space between the housing 120 and the second rotor shaft 157. In another version, the housing 120 and the first rotor shaft 155 of the rotor 110 alternatively or additionally define a space for fluid between each other.

Figure 3:
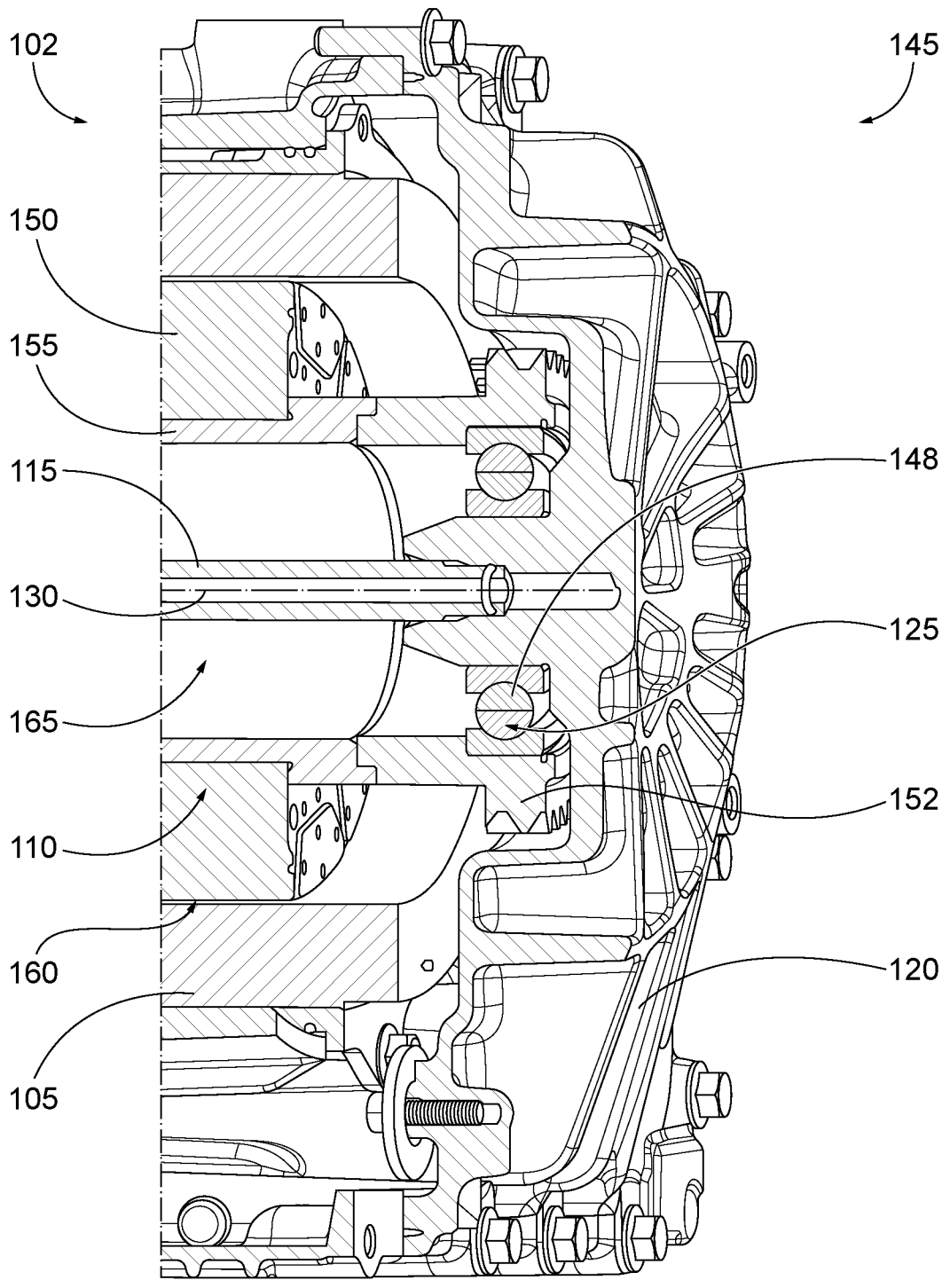
FIG. 3 is a cross-sectional view of a second end of the FIG. 1 system.

FIG. 3 depicts a cross-sectional view of the second end 145 of the motor 102. On the second end 145, the motor 102 defines additional spaces that form at least a portion of the pathways for fluid to flow. In one embodiment, the housing 120 fully defines at least one space for fluid on the second end 145. In another embodiment, the housing 120 and the rotor 110 define a space for fluid between each other on the second end 145. In one version, the housing 120 and the rotor gear 152 of the rotor 110 define a space for fluid between each other on the first end 140. For example, fluid may flow around the second bearings 148 that are positioned in a space between the housing 120 and the rotor gear 152.

In the illustrated embodiment, fluid is supplied to the motor 102 on the second end 145. The motor 102 provides a path for fluid to travel into the second end 145 from outside the motor 102. For example, the motor 102 may be connected to a transmission and/or another device on the second end 145, and fluid flows from that device to the motor 102. In one embodiment, the motor 102 is specifically configured to receive fluid through the lubricant shaft 115. In another embodiment, the motor 102 is configured to receive fluid through multiple portions of the motor 102 at the second end 145.

Figure 4:
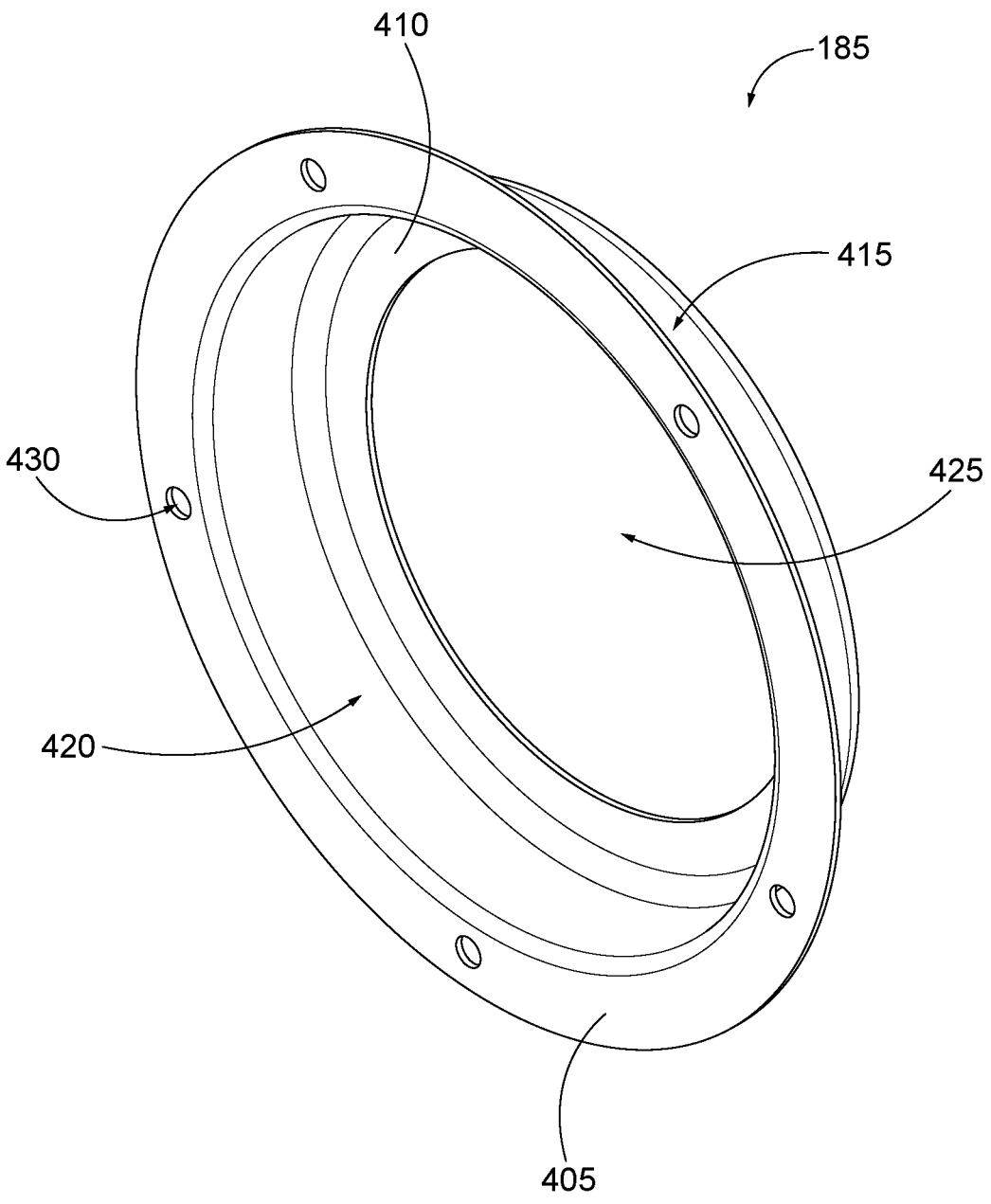
FIG. 4 is a bottom perspective view of a deflector found in the FIG. 1 system.

Referring to FIG. 4, the deflector 185 generally includes a mounting flange 405, a rotor flange 410, and a drainage wall 412 that connects the mounting flange 405 to the rotor flange 410. The deflector 185 further includes an outer surface 415 and an inner surface 420. The deflector 185 further defines a rotor opening 425 at the rotor flange 410 and one or more fastener openings 430 at the mounting flange 405. In one form, the deflector 185 is generally ring shaped in order to conform to the cylindrical shape of the stator 105 and rotor 110. In the illustrated embodiment, the deflector 185 extends completely around the circumference of the stator 105 or rotor 110 to form a ring. In an alternate embodiment, the deflector 185 extends only partially around the circumference of the stator 105 or rotor 110 so as to form discrete arc segments.

The mounting flange 405 forms the radially outward portion of the deflector 185. In the illustrated embodiment, the deflector 185 attaches to the motor 102 through the mounting flange 405. The fastener openings 430 extend completely through the mounting flange 405 (i.e., through both sides). The fastener openings 430 each provide a space for a bolt and/or another type of fastener to couple to the deflector 185. The housing 120 of the motor 102 defines similar openings for fasteners which allow the deflector 185 to couple to the motor 102. In the depicted embodiment, the rotor flange 410 of the deflector 185 is bolted to the housing 120. In another embodiment, the deflector 185 does not define fastener openings 430, and the deflector 185 couples to the motor 102 without using fasteners such as through welding. In a further embodiment, the deflector 185 does not define fastener openings 430, and the deflector 185 is an integral part of the housing 120 of the motor 102.

The rotor flange 410 forms the radially inward portion of the deflector 185. The rotor flange 410 is positioned around a portion of the lubricant shaft 115 and/or rotor 110 when the deflector 185 is attached to the housing 120. The rotor flange 410 defines the rotor opening 425 on an interior portion of the deflector 185. The rotor opening 425 provides space to position the rotor 110 and/or other parts of the motor 102. In one embodiment, the width of the rotor opening 425 is greater than the width of the rotor 110 such that the rotor flange 410 is spaced from the rotor 110 at a specific clearance distance. In an alternate embodiment, the width of the rotor opening 425 is substantially equal to the width of a bushing on the rotor 110 such that rotor flange 410 forms a fluid barrier with the bushing and rotor 110.

The drainage wall 412 extends between the mounting flange 405 and the rotor flange 410. The drainage wall 412 is angled at transverse angles relative to the mounting flange 405 and the rotor flange 410. The drainage wall 412 gives the deflector 185 an overall frustoconical shape. When installed, the rotor flange 410 and the drainage wall 412 of the deflector 185 in essence create a gutter that directs fluid flow. In one embodiment, a portion of the drainage wall 412 is sloped between the mounting flange 405 and rotor flange 410. In another embodiment, one or more portions of the drainage wall 412 are curved such that the outer surface 415 of the drainage wall 412 smoothly transitions between the mounting flange 405 and rotor flange 410. When the deflector 185 redirects a fluid that is moving from the second end 145 towards the first end 140, the drainage wall 412 contacts the fluid and deflects the fluid radially outward.

The inner surface 420 is positioned on the lower portion of the deflector 185. The inner surface 420 includes and extends between the lower surfaces of the mounting flange 405 and the rotor flange 410. In the illustrated embodiment, the deflector 185 has a uniform thickness such that the inner surface 420 is generally the same shape as the outer surface 415. In an alternate embodiment, the inner surface 420 is distinctly shaped from the outer surface 415 such that the thickness of the deflector 185 varies along the radius 135. When the deflector 185 redirects a fluid that is moving from the first end 140 towards the second end 145, the inner surface 420 contacts the fluid and deflects the fluid radially outward. In one embodiment, the inner surface 420 deflects the fluid back towards the first end 140. In another embodiment, the inner surface 420 deflects the fluid radially inward and towards the track 170, and the track 170 guides the fluid radially outward.

Figure 5:
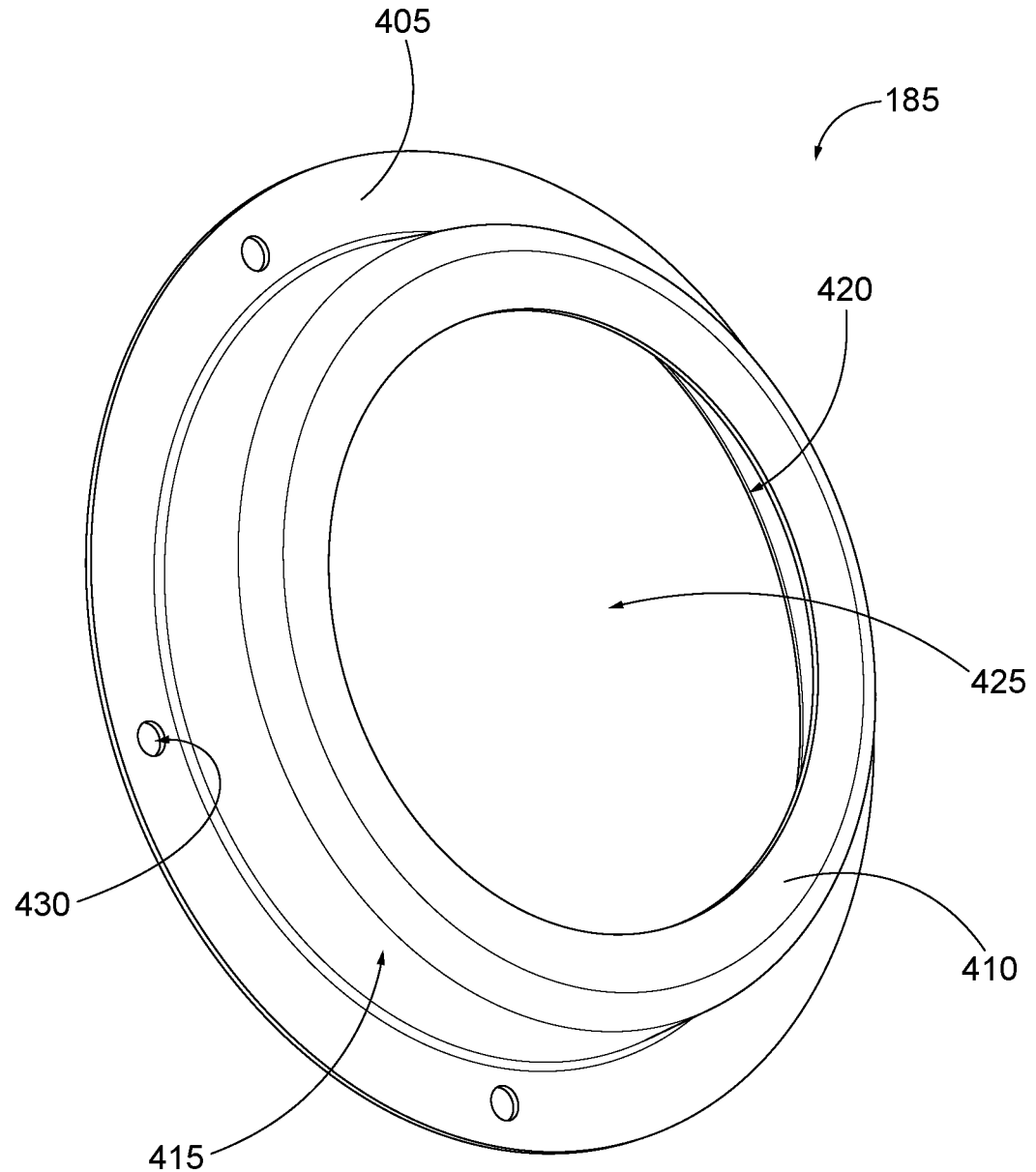
FIG. 5 is a top perspective view of the FIG. 4 deflector.
Figure 6:
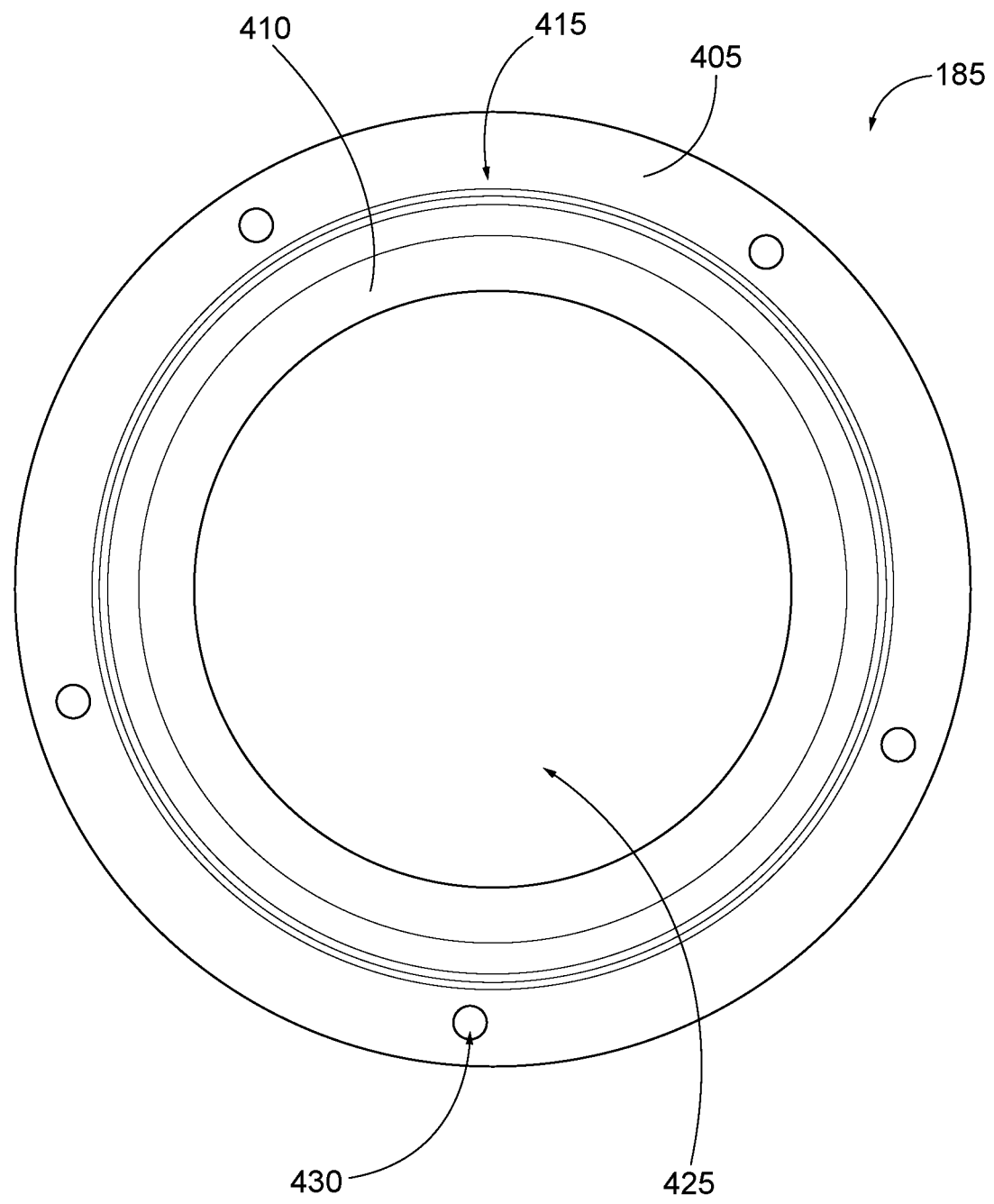
FIG. 6 is a top view of the FIG. 4 deflector.
Figure 7:
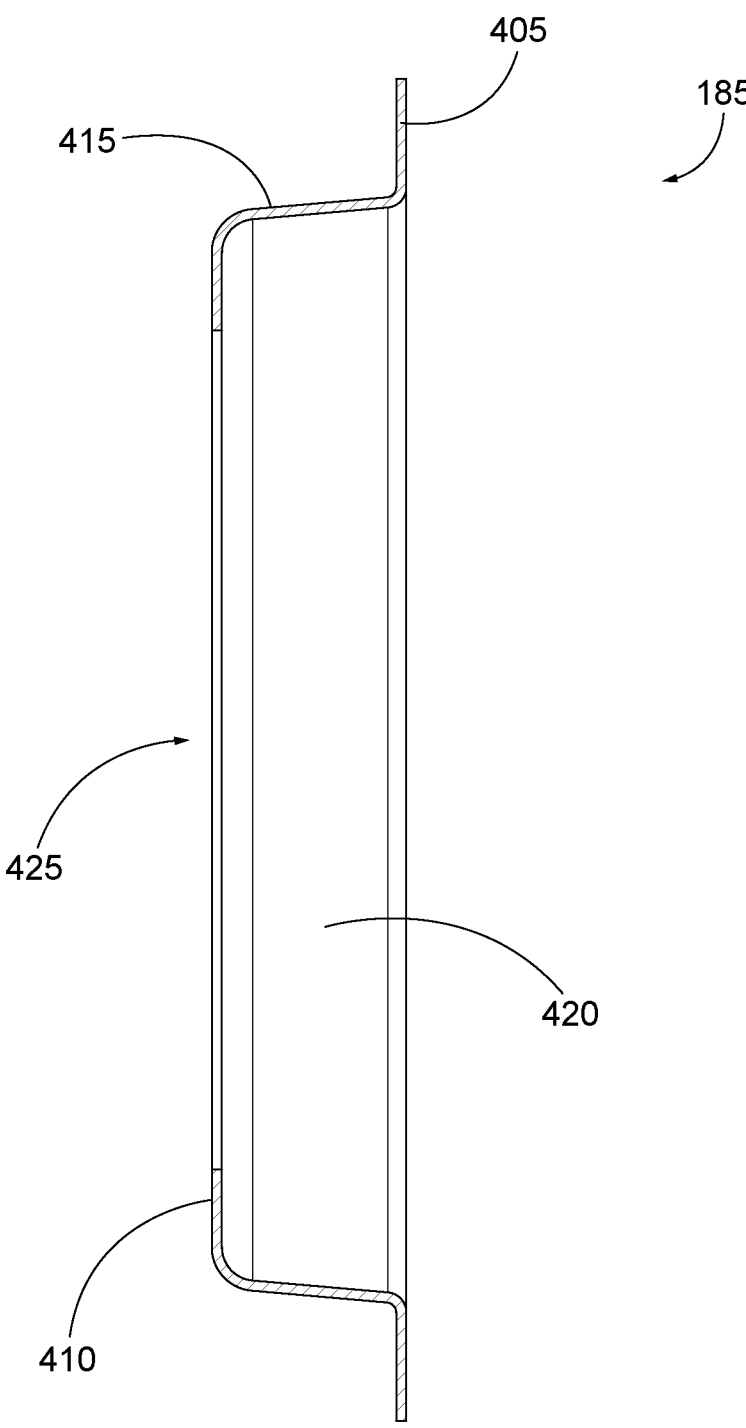
FIG. 7 is a cross-sectional view of the FIG. 4 deflector.

FIGS. 5, 6, and 7 provide additional views of the deflector 185. FIG. 5 depicts a top perspective view of the deflector 185. FIG. 6 depicts a top plan view of the deflector 185. FIG. 7 depicts a cross-sectional side view of the deflector 185. In the illustrated embodiment, the shape of the inner surface 420 generally matches the shape of the outer surface 415. Specifically, the inner surface 420 is shaped with similar sloped and curved portions as in the outer surface 415.

Figure 8:
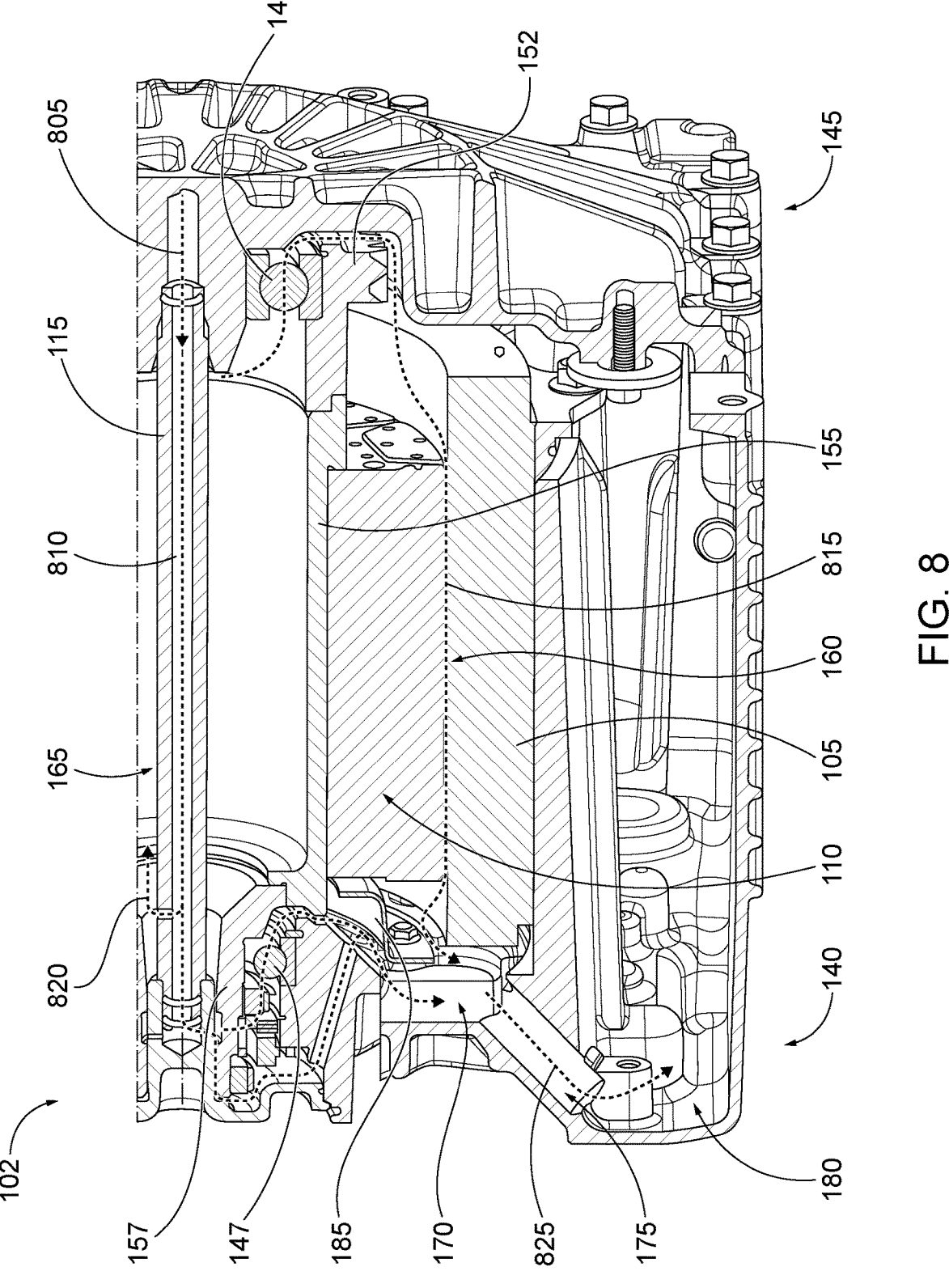
FIG. 8 is a diagram showing the flow of fluid within the FIG. 1 system.

FIG. 8 depicts a diagram of fluid flowing through the motor 102. As examples, the fluid can be motor oil, a mixture of oil and air, and/or another fluid. The fluid enters the motor 102 through a supply path 805. The motor 102 defines the supply path 805 on the second end 145. In one embodiment, the supply path 805 is a continuation of a fluid pathway from a device connected to the motor 102 at the second end 145. For example, a transmission that is connected to the motor 102 defines a portion of the supply path 805. In the illustrated embodiment, the lubricant shaft 115 defines at least a portion of the supply path 805 within the motor 102.

After fluid has entered the motor 102 through the supply path 805, the fluid flows through a first flow path 810 and a second flow path 815. Both the first flow path 810 and the second flow path 815 continue from the second end 145 towards the first end 140. In one embodiment, the motor 102 defines one or more additional pathways for fluid to flow between the first end 140 and second end 145. Primarily, the first flow path 810 and second flow path 815 support fluid flow to the first bearings 147 on the first end 140 and the second bearings 148 on the second end 145. In this way, the motor 102 is configured to lubricate and cool both the first bearings 147 and the second bearings 148 in order to facilitate operation of the motor 102. The first flow path 810 and second flow path 815 additionally support fluid flow to other parts of the motor 102 such that fluid cools and/or lubricates those parts.

In the illustrated embodiment, the first flow path 810 continues from the supply path 805 through the interior of the lubricant shaft 115. Optionally, fluid flows through a rotor cavity path 820 that branches from the first flow path 810. The rotor cavity path 820 allows fluid to flow into the rotor cavity 165 in order to cool the rotor 110. The lubricant shaft 115 defines an opening that extends between the interior of the lubricant shaft 115 and the rotor cavity 165. In the illustrated embodiment, the opening, a portion of the second rotor shaft 157, and the rotor cavity 165 collectively define the rotor cavity path 820.

When the first flow path 810 reaches the first end 140, the first flow path 810 continues towards the first bearings 147. The lubricant shaft 115 and the second rotor shaft 157 define openings on the first end 140 that form a portion of the first flow path 810. Additionally, portions of the second rotor shaft 157 define a space that forms a portion of the first flow path 810. In an alternate embodiment, one or more bushings define such openings. The first flow path 810 then guides fluid around the first bearings 147 to provide lubrication and cooling. In the illustrated embodiment, the first flow path 810 branches into multiple paths that reconvene at the deflector 185. One path of the first flow path 810 continues between the housing 120 and the first rotor shaft 155. The housing 120 additionally defines a space that forms another path of the first flow path 810. As should be appreciated, one or more bushings could define a space independently or in combination with the housing 120, first rotor shaft 155, and/or second rotor shaft 157. When the first flow path 810 reaches the deflector 185, the deflector 185 forms a barrier between the first flow path 810 and the second flow path 815. The deflector 185 redirects fluid from the first flow path 810 such that the fluid does not flow against or across the second flow path 815. In other words, the deflector 185 extends radially outwards so as to block the fluid from the first flow path 810 from flowing into the gap 160 between the stator 105 and the rotor 110.

On the second end 145, the second flow path 815 continues from the supply path 805 towards the second bearings 148. The lubricant shaft 115, housing 120, and rotor gear 152 define space that forms a portion of second flow path 815. As should be appreciated, one or more bushings could define a space independently or in combination with the lubricant shaft 115, housing 120, and/or rotor gear 152. The second flow path 815 then guides fluid around the second bearings 148 to provide lubrication and cooling. Fluid in the second flow path 815 additionally cools and lubricates the rotor gear 152. After passing the second bearings 148, the second flow path 815 continues towards the first end 140 through the gap 160. Fluid absorbs heat from the stator 105 and rotor 110 as the fluid flows along the second flow path 815 through the gap 160. When the second flow path 815 reaches the deflector 185, the deflector 185 forms a barrier against the fluid that is exiting the gap 160. The deflector 185 redirects fluid from the second flow path 815 such that the fluid does not flow against or across the first flow path 810.

By preventing fluid in the first flow path 810 from flowing against fluid in the second flow path 815, the deflector 185 supports steady fluid flow in the second flow path 815. Specifically, the deflector 185 prevents fluid from flowing into both sides of the gap 160. Fluid flowing into both sides of the gap 160 obstructs fluid flow and causes fluid to pool in the gap 160. Pooled fluid in the gap 160 typically reduces the efficiency and other performance metrics of the motor 102. For example, the pooled fluid can cause heat to build up in the gap 160, increase drag between the stator 105 and rotor 110, and/or cause other issues. The deflector 185 prevents this fluid pooling and enhances overall performance of the motor 102 by redirecting fluid in the first flow path 810 and second flow path 815.

The redirected fluid then travels from the first flow path 810 and second flow path 815 to a drainage path 825. The track 170, drain 175, and sump 180 form the drainage path 825. Fluid enters the drainage path 825 when the deflector 185 redirects fluid from the first flow path 810 and second flow path 815 into the track 170. The drainage path 825 guides fluid radially outward through the drain 175 and into the sump 180 to be collected.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"3D printing" or "additive manufacturing" generally refers to the process of creating a physical object by adding material together in multiple steps. Material may be deposited, joined, and/or solidified in a variety of ways to form the object. For example, the object may be created by curing portions of a liquid resin, selectively fusing portions of a powder together, extruding a resin or melted filament into a desired shape, and/or another method of creating a solid object. The process typically includes multiple steps. For example, the object may be created by continuously forming small sections of the object, by sequentially forming vertical layers, and/or through another method. Alternatively, the object may be formed all at once. 3D printing may be used to create objects from plastic, metal, and/or other materials. 3D printing may utilize a variety of tools to create objects. For example, 3D printing may utilize extruders, lasers, other light emitting devices, and/or other devices to from objects. In some cases, an object may be considered 3D printed if the object is cast from a mold that has been directly 3D printed. For example, a metal object may be considered 3D printed if it is cast from a 3D printed sand mold. A computer or other computational device typically controls the process of 3D printing. The computer controls the 3D printing process to create a physical representation of a digital model.

"Axial Depth" means here a length or distance along a defined axis, where an axis is a fixed linear reference line.

"Axis" generally refers to a straight line about which a body, object, and/or a geometric figure rotates or may be conceived to rotate.

"Bearing" generally refers to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Bushing" generally refers to a simple type of bearing that provides a contact surface for a rotating part. Bushings are typically, but not always, tube-shaped and do not include rolling elements, such as ball bearings. Bushings may be fully circumferential, such as a solid sleeve bushing, or may not be, such as a split or clenched bushing. In some cases, multiple bushings are arranged in a bushing set around a common rotational axis.

"Deflector" generally refers to a structure or device that is configured to redirect, reflect, and/or guide the flow of a fluid, such as a gas or liquid. Typically, but not always, a deflector is shaped such that when a fluid flows against a surface of the detector, the surface physically changes the direction of fluid flow. For example, the deflector may have one or more sloped, curved, bent, and/or other-shaped surfaces that block or change direction of the flow of a fluid. Deflectors are rigid such that the shape of a deflector is not substantially deformed when fluid flows against the deflector. For example, deflectors may be made from steel, aluminum, plastic, and/or another rigid material. In some cases, a deflector is thin and plate-shaped.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operates in the reverse direction, accepting mechanical energy and converting the mechanical energy into electrical energy.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Flow" generally refers to the motion of a fluid. In some cases, flow of a fluid is contained within a channel or other space defined by one or more solid objects. For example, flow of a fluid can be contained within a pipe, a vent, a hose, a vessel, a space defined between multiple objects, and/or another space. Typically, flow of a fluid is contained such that the fluid is guided in a desired direction along a desired pathway. The direction of the flow at a point is the collective direction that various sections of a fluid move toward at that point. For example, the direction of flow may be the average of the directions that different sections of a body of fluid move toward. In one example, a fluid can flow in a smooth, laminar fashion such that all or nearly all of the body of fluid flows in the same general direction. In another example, a fluid can flow in a turbulent fashion where one or more sections of the body of fluid recirculate, swirl, move randomly, and/or move in another way against the general direction of flow.

"Fluid" generally refers to a substance that does not have a fixed shape. For example, a fluid includes a liquid and/or a gas. Typically, fluids are able to flow easily, such as air flowing over a wing, blood flowing through a circulatory system, water flowing through plumbing, or oil flowing through a motor as examples. In some cases, a fluid refers to a mixture of solids, liquids, and/or gases. For example, a slurry of solids and water, liquid droplets mixed with air, aerated solid particles, a mixture of solids with liquids and gases, and/or other mixtures of different materials may be fluids.

"Gap" or "Air Gap" generally refers to a space between the stator and rotor of a motor. An air gap typically contains non-magnetic material and is not necessarily filled with air. Specifically, in an electric motor, the material in the air gap is non-magnetic. For example, the air gap may contain water, oil, plastic, air, gas, and/or other non-magnetic materials. In many cases, the air gap is very narrow such that the stator and rotor are spaced close together. In one example, the air gap distance is on the order of one millimeter. In another example, the air gap extends less than one millimeter between the stator and rotor.

"Housing" generally refers to a component that covers, protects, or supports another thing. For example, the casing of a desktop computer is its housing component and can be made of multiple materials to protect the internal component.

"Integrally Formed" generally refers to a component and/or multiple components that are fused into a single piece. Integrally formed components are incapable of being dismantled without destroying the integrity of the component.

"Lateral" generally refers to being situated on, directed toward, or coming from the side.

"Longitudinal" generally refers to the length or lengthwise dimension of an object, rather than across.

"Lubricant" generally refers to a substance that is used to reduce friction between the surfaces of rotating or moving objects. For example, a lubricant may be an oil or grease that is used to reduce friction between ball bearings, interlocking gears, and/or other rotating parts in a motor or engine. In addition to reducing friction, lubricants may be used for other purposes. For example, lubricants may cool surfaces, transport particles, transmit forces, and/or perform other functions.

"Metallic" generally refers to a material that includes a metal, or is predominately (50% or more by weight) a metal. A metallic substance may be a single pure metal, an alloy of two or more metals, or any other suitable combination of metals. The term may be used to refer to materials that include nonmetallic substances. For example, a metallic cable may include one or more strands of wire that are predominately copper sheathed in a polymer or other non-conductive material.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, a pneumatic piston, a hydraulic piston, and/or an internal combustion engine.

"Opening" generally refers to a space or hole that something can pass through.

"Plastic" generally refers to a group of materials, either synthetic, semi-synthetic, and/or naturally occurring, that may be shaped when soft and then hardened to retain the given shape. Plastics are polymers. A polymer is a substance made of many repeating units. Plastics are generally insulators.

"Radially Outward" generally refers to a relative position that is positioned at a greater distance from a defined center point or axis. An object may be extending radially outward if the object has a starting point at a given distance from the defined center or axis and then moves farther away from that center point or axis.

"Rotor" generally refers to a part or portion in a machine that rotates in or around a stationary part, which is commonly referred to as a stator. The rotor is the moving or rotating part of a rotary system, such as found in electric generators, electric motors, sirens, mud motors, turbines, and/or biological rotors. In one particular non-limiting example, the rotor includes the rotating portion of an electric generator and/or motor, especially of an induction motor.

"Shaft" generally refers to a part that rotates about a central axis. Shafts are a part of various mechanically rotating devices, such as motors, engines, transmissions, gearsets, and/or other devices. Shafts are usually, but not always, used to transfer mechanical torque between various mechanical components. For example, the shaft of a motor may transfer energy to a transmission, an axle, a wheel, and/or another device. In some cases, the shaft of a device is integrated with other parts of that device. The shaft can be shaped in any number of manners. For instance, the shaft can have a cylindrical or rectangular shape, and the shaft can be hollow or solid.

"Stator" generally refers to a stationary part or portion in a machine in or about which a rotating part revolves, which is commonly referred to as a rotor. The stator is the stationary part of a rotary system, such as found in electric generators, electric motors, sirens, mud motors, turbines, and/or biological rotors. In one particular non-limiting example, the stator includes the stationary portion of an electric generator and/or motor, especially of an induction motor.

"Sump" generally refers to a space that is configured to collect fluids from a device or system. A sump may be formed by a portion of a device or system, or a sump may be formed by a separate part that is attached to a device or system. For example, an oil pan on an engine or motor may be integrally formed with a housing of the engine or motor, or may be a separate part attached to the engine or motor. A sump is typically located on a bottom portion of a device in order to collect fluid that flows downward due to gravity. In some cases, a sump includes a pump that is configured to transport fluid from the sump to other parts of a device or system.

"Turbulence" generally refers to a chaotic, unsteady, and/or non-uniform quality of the motion of a fluid. For example, a flow may be turbulent when sections of a fluid recirculate, swirl, move randomly, and/or move in another way against a general direction of flow. The turbulence of a flow increases when more sections of the fluid move chaotically and/or when a velocity of the chaotic sections of the fluid increases. Turbulence is caused by changes in pressure and/or physical disruptions in the flow of a fluid. For example, the shape of an object in the path of flow of a fluid can disrupt the flow and cause the flow to be turbulent.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 system
102 motor
105 stator 110 rotor
115 lubricant shaft
120 housing
125 bearings
130 axis
135 radius
140 first end
145 second end
147 first bearings
148 second bearings
150 rotor body
152 rotor gear
155 first rotor shaft
157 second rotor shaft
160 gap
165 rotor cavity
170 track
175 drain
180 sump
185 deflector
405 mounting flange
410 rotor flange
412 drainage wall
415 outer surface
420 inner surface
425 rotor opening
430 fastener opening
805 supply path
810 first flow path
815 second flow path
820 rotor cavity path
825 drainage path

What is claimed is:

1. A system, comprising:
a motor having a first end and a second end located opposite the first end along a rotational axis of the motor, the motor including:
a rotor;
a stator;
wherein the rotor and the stator define a gap;
a first bearing set disposed at the first end, wherein the motor has a first flow path of a fluid configured to lubricate the first bearing set;
a second bearing set disposed at the second end, wherein the motor has a second flow path of the fluid configured to lubricate the second bearing set, wherein the second flow path flows from the second bearing through the gap between the rotor and the stator, wherein the second flow path flows from the second end to the first end when in the gap between the rotor and the stator; and
a deflector configured to form a barrier between the first flow path and the second flow path, wherein the deflector extends at the first end of the motor proximal to the gap to block the first flow path from entering the gap between the rotor and the stator.

2. The system of claim 1, wherein the motor is an electric motor.

3. The system of claim 1, wherein:
the second end has more turbulent flow of the fluid than the first end; and
the deflector is positioned at the first end of the motor.

4. The system of claim 1, further comprising:
a shaft defining a passage from the first end to the second end of the motor for the first flow path.

5. The system of claim 1, wherein:

the deflector has a drainage wall extending between the first flow path from the first bearing set and the gap at the first end to promote the fluid in the second flow path to flow in a single direction from the second end to the first end within the gap;

the motor defines a drain; and the first flow path and the second flow path flow along opposite surfaces of the drainage wall to direct the first flow path and the second flow path towards the drain.

6. The system of claim 5, wherein the drainage wall extends to give the deflector an overall frustoconical shape.

7. The system of claim 5, wherein:

the deflector has a mounting flange; and the mounting flange has one or more fastener openings where the deflector is fastened to the motor.

8. A system, comprising:

a motor having a first end and a second end located opposite the first end along a rotational axis of the motor, the motor including:

a first bearing set disposed at the first end, wherein the motor has a first flow path of a fluid configured to lubricate the first bearing set;

a second bearing set disposed at the second end, wherein the motor has a second flow path of the fluid configured to lubricate the second bearing set;

a deflector configured to form a barrier between the first flow path and the second flow path;

a housing defining a sump;

wherein the deflector is attached to the housing of the motor; and wherein the deflector is configured to direct fluid flow to the sump.

9. A system, comprising:

a motor having a first end and a second end located opposite the first end along a rotational axis of the motor, the motor including:

a first bearing set disposed at the first end, wherein the motor has a first flow path of a fluid configured to lubricate the first bearing set;

a second bearing set disposed at the second end, wherein the motor has a second flow path of the fluid configured to lubricate the second bearing set;

a deflector configured to form a barrier between the first flow path and the second flow path, the deflector having a mounting flange, a rotor flange, and a drainage wall connecting the mounting flange to the rotor flange;

wherein the rotor flange defining a rotor opening in which the rotor is received; and wherein the drainage wall extends at a transverse angle from the mounting flange.

10. The system of claim 9, wherein the drainage wall extends to give the deflector an overall frustoconical shape.

11. The system of claim 9, wherein the mounting flange having one or more fastener openings where the deflector is fastened to the motor.

12. A system, comprising:

an electric motor including a stator and a rotor configured to rotate relative to the stator;

wherein the rotor and the stator define a gap; and a deflector configured to promote fluid flow in a single direction within the gap between the rotor and the stator, the deflector having a mounting flange, a rotor flange, and a drainage wall connecting the mounting flange to the rotor flange.

13. The system of claim 12, wherein:

the electric motor has a first flow path and a second flow path for a fluid;

the second flow path flows through the gap between the rotor and the stator;

the deflector is configured to inhibit the fluid from the first flow path from flowing into the gap between the rotor and the stator; and the deflector is configured to promote the fluid from the second flow path to flow in a single direction within the gap between the rotor and the stator.

14. The system of claim 12, wherein:

the electric motor has a first end and a second end located opposite the first end, the electric motor including:

a first bearing set disposed at the first end;

a second bearing set disposed at the second end;

the electric motor has a first flow path of a fluid configured to lubricate the first bearing set;

the electric motor has a second flow path of the fluid configured to lubricate the second bearing set;

the second flow path flows through the gap between the rotor and the stator; and the deflector is configured to inhibit the fluid from the first flow path from flowing into the gap between the rotor and the stator.

15. The system of claim 12, wherein the deflector is positioned at an end that is opposite to an end of the electric motor with more turbulent flow.

16. The system of claim 12, wherein:

the mounting flange having one or more fastener openings where the deflector is fastened to the electric motor; and the fastener openings are spaced evenly apart from one another around a circumference of the mounting flange.

17. The system of claim 12, wherein the drainage wall extends to give the deflector an overall frustoconical shape.

18. A method, comprising:

lubricating a first bearing set at a first end of a motor with a fluid flowing along a first flow path;

lubricating a second bearing set at a second end of the motor with the fluid flowing along a second flow path;

wherein the motor has a rotor and a stator that define a gap;

flowing the fluid in the second flow path in a single direction in the gap between the rotor and the stator from the second end to the first end; and blocking the fluid flowing along the first flow path from the first bearing set from entering the gap at the first end with a deflector extending proximal to the gap at the first end.

19. The method of claim 18, further comprising:

collecting the fluid from the first flow path and the second flow path in a sump.

20. The method of claim 18 further comprising:

directing with the deflector the fluid of the first flow path and the fluid of the second flow path to flow along opposite surfaces of the deflector toward a drain for a sump of the motor.

* * * * *